United States Patent Office 2,852,452
Patented Sept. 16, 1958

2,852,452

ELECTROLYTIC PROCESS

George L. Cunningham, Shaker Heights, Ohio, Frank Pretka, Carnegie, Pa., and Charles J. Zelnik, North Olmsted, Ohio, assignors to Horizons Incorporated, Princeton, N. J., a corporation of New Jersey No Drawing. Application May 16, 1956
Serial No. 585,368

8 Claims. (Cl. 204—113)

This invention relates to a new and novel procedure for preventing the hydrolysis of solutions containing iron, either in the form of ferric or ferrous iron and to the production of various oxides of titanium and of metallic iron. More particularly it relates to a discovery made by us that certain di- and tri-carboxylic acids added in minute but significant amounts will prevent the hydrolysis of iron containing solutions in a process in which ilmenite ores are converted to an oxide of titanium and a powdered iron product.

There are known to be vast deposits of titaniferous minerals in the United States and Canada, in which the titanium occurs as ilmenite ($FeO.TiO_2$). For many years efforts have been made to develop inexpensive processes for recovering the iron and titanium content of ilmenite separately as useful articles of commerce. Some of these efforts have taken the form of pyro-metallurgical processes such as the one described in Pierce et al. Patent 2,476,453 in which the ilmenite is smelted in an electric furnace to produce a slag rich in $TiO_2$ and a molten iron product which is readily separated therefrom. One disadvantage of processes of this type is the high temperature necessary to carry out the reaction which inevitably entails the use of expensive equipment. Another approach is described in the work of the Department of Mines (Canada) under whose auspices a process was extensively investigated by R. J. Traill and W. R. McClelland as set forth in the annual report of the "Investigation in Ore Dressing and Metallurgy" published by the Mines Branch of the Canadian Department of Mines in 1925 and in subsequent years.

In the process therein described ilmenite was reduced by means of carbon in a furnace in which the temperatures and atmosphere were controlled whereby the iron oxide was converted to metallic iron and the titanium dioxide was unchanged. The product was subjected to magnetic separation to remove gangue and unburnt carbon and the magnetic fraction was then treated with ferric chloride to dissolve the iron away from an insoluble residue of impure titanium dioxide. The ferrous chloride so formed, containing various other metals as impurities, was purified and then electrolyzed in a diaphragm cell to produce iron as a cathode deposit and to regenerate ferric chloride for recycling to the leaching operation, whereby the reduced ore was separated into components.

While the process appears economically attractive, no commercial installation based thereon has ever, to our knowledge, been successfully operated. As a result of extensive investigation of the process we have discovered and overcome a number of technical obstacles which must be solved in order to render the process efficient and economical.

It is well known that ferrous and ferric chloride solutions tend to hydrolyze under certain conditions. The amount of hydrolysis of such solutions varies with both composition and temperature. Thus ferrous chloride solutions stored at room temperature were found to undergo less hydrolysis than ferrous chloride solutions of the same concentration maintained at 80° C. When hydrolysis does occur, finely divided hydroxides or hydrated iron chlorides are precipitated and in a cyclic process such as that described above, the concentration of these precipitates increases and seriously interferes with the process.

Briefly, our invention resides in the discovery that by adding a suitable amount of an unsubstituted di- or tri-carboxylic acid such as citric, tartaric or succinic acid, hydrolysis of ferrous and ferric chloride solutions can be prevented while recovering titanium dioxide and powdered iron from an ilmenite ore by the process about to be described.

In our process, ilmenite, crushed to pass a 100 mesh screen (Tyler Standard) is blended with a carbonaceous reducing agent and reduced in any manner known in the art. The reduction step forms no part of our invention. It should be noted however that the reduction may proceed in either of two ways without materially altering our process. In the one method, the ilmenite is reduced under a vacuum with an amount of carbon as coal, coke, charcoal, or even as a carbon containing gas such as methane, and at temperatures appropriate to the formation of metallic iron and either titanium monoxide (TiO) or titanium sesquioxide ($Ti_2O_3$) or other lower oxide of titanium. In the other method the titania portion of the ilmenite is relatively unchanged, being obtained as titanium dioxide ($TiO_2$) while the iron portion is reduced to metallic iron. In either method, gangue and unburnt carbon are removed and the reduction product must then be treated to separate the metallic iron from the oxide of titanium and from any other unreduced material present.

The separation of the metallic iron from the $TiO_2$ or lower oxide of titanium is accomplished by leaching the sponge produced in the reduction step with a solution of ferric chloride, or—after the process has been operated for an entire cycle—with a solution of ferric and ferrous chlorides obtained from the anolyte overflow in a later stage of the process. As reported in the aforementioned development work of the Canadian Department of Mines, leaching at a temperature of between 90° C. and 100° C. results in a quicker extraction of the metallic iron than leaching at lower temperatures, but since the reaction $2FeCl_3 + Fe \rightarrow 3FeCl_2$ is exothermic, even leaching with a solution which is initially at room temperature produces a liquor with a temperature of 50° C. or higher in a short time. As the temperature increases, the rate of hydrolysis of the solutions was found to increase markedly. The hydrolysis products precipitated on the reduced ore being leached and, as a result, the efficiency of the process rapidly diminished because greater amounts of iron were left in the residue and because intimate and complete contact between the residue and leaching liquid was prevented. We have found that the presence of minute but significant amounts of hydrolysis preventing agent such as citric acid, completely prevents hydrolysis during the leaching step. Since the value of the titanium oxide residue depends in large measure upon its purity, the removal of all of the iron and any other impurities is not only desirable but it is also necessary to the economic success of the process.

Other metal values in the ore which were reduced to metal in the reduction step, and which react with the leach liquor are removed at this stage of the process to prevent interference with the electrodeposition of iron. Thus, copper, nickel, cobalt, lead and similar metals are precipitated as sulfides and the purified leach liquor is then sent to a cell for electrolysis.

A diaphragm cell was employed in the Canadian work above noted for electrolysis of the purified leach liquor and recovery of iron therefrom as an electrodeposit. The diaphragm cell used by us was formed of mild steel, the interior of which was coated with rubber. The inside dimensions, 12 inches x 8 inches x 6 inches were divided into a cathode compartment 8 inches long, 8 inches wide and 6 inches deep and an anode compartment 4 inches long, 8 inches wide and 6 inches deep. Our anodes were solid pieces of graphite two inches thick and our cathodes were sheets of stainless steel or Monel metal having 35 square inches of surface. The anode and cathode were spaced less than one inch apart, being separated from one another by the membrane which defined the anode and cathode chambers.

We have found that during the electrolysis in the diaphragm cell, hydrolysis of the electrolyte produced hydrolysis products which tended to fill up the interstices of the diaphragm and impeded circulation of the electrolyte between the anode and cathode compartment of the cell. As hydrolysis continued, the electrolysis did not proceed smoothly and instead increasing voltages were required (with obvious decrease in efficiency) in order to obtain any deposit on the cathode. In addition, we have found it to be necessary to frequently clean the diaphragms with hydrochloric acid, further increasing maintenance costs.

Furthermore, when hydrolysis occurred in the electrolyte or in the ferric chloride being recycled to the leaching step, hydrolyzed iron compounds precipitated in the equipment and circulation of the recycled liquid was greatly impaired.

To prevent these undesirable operating conditions from occurring, then, it was necessary to find a method of preventing hydrolysis of the iron in any of the solutions in which it is present in the process. We found that the addition of up to about 0.1% by weight of a polycarboxylic acid inhibits the hydrolysis of the iron completely. We have further found that once the acid has been added it circulates along with the iron chloride liquors through the leaching operation and back to the electrolytic cell without any appreciable deterioration in its affectiveness. Hence it becomes necessary merely to add an amount of acid from time to time sufficient to compensate for spillage or other mechanical losses in the system. The process is otherwise self-sufficient once the necessary addition of acid has been made. We have also found that when any slight excess of the acid is present, for example, as a result of an inadvertent or accidental addition, the excess appears to be oxidized during the electrolytic deposition of the iron and hence the system tends to correct very slight deviations from the proper acid concentration.

We are aware that polycarboxylic acids have been added to electrolytic cells to improve the plating efficiency, adherence of the deposit or other process features but insofar as we are aware, all such additions have involved substantially greater concentrations of these acids than those contemplated in the practice of our invention, and in such systems, this excess is entirely too great to permit the system to correct itself during the electrolytic step.

To illustrate the effect of small additions of polycarboxylic acids to the leach liquor, the filtrate was divided into equal aliquots of about 50 cc. each. One of these served as a blank, while very minute amounts of citric acid were added to the remaining portions. The following table illustrates the effect of these additions.

| cc. Solution | Grams Citric Acid | pH of Solution Before Heating | pH of Solution After Heating 4 hours at 80-85° C. | Results |
|---|---|---|---|---|
| 50 | Blank | 1.39 | 0.70 | Solution turbid. Heavy precipitate of iron hydroxide. |
| 50 | .05 | .62 | 0.70 | Solution clear. No precipitate; no hydrolysis. |
| 50 | .025 | | | Solution clear. A slight precipitate of iron hydroxide. Very little hydrolysis. |
| 50 | .01 | | | Solution slightly cloudy and a very slight precipitate of iron hydroxide. |
| 50 | .005 | | | Solution clear. Slight precipitate of iron hydroxide. |
| 50 | .0025 | | | Solution clear. Precipitate of iron hydroxide. |
| 50 | .001 | | | Do. |

The effect of tartaric acid additions on the hydrolysis of heated solutions of ferric and ferrous chlorides is illustrated below.

| cc. Solution | Grams Tartaric Acid | pH of Solution Before Heating | pH of Solution After Heating 4 hrs. at 80-85° C. | Results |
|---|---|---|---|---|
| 50 | Blank | 1.4 | .081 | Solution turbid. Heavy precipitate of iron hydroxide. |
| 50 | 0.05 | .78 | .90 | A small amount of precipitate. Very slight hydrolysis. |
| 50 | 0.025 | | | Slightly more precipitate. |
| 50 | 0.01 | | | Do. |
| 50 | 0.005 | | | Severe hydrolysis began. Slightly less severe than in the blank. |
| 50 | 0.001 | | | Severe hydrolysis approximately as much as in the blank. |

Our addition of the extremely small amount of a polycarboxylic acid to the electrolyte, was also found to improve the electrolytic portion of the process, because as shown above, by addition of the limited amount of the polycarboxylic acid, it was found that the pH of the electrolyte could be maintained nearly constant within any desired limited range of pH values. We observed that in the absence of such an addition, the pH of the electrolyte often varied during the electrolysis and that when this occurred, the electrodeposit was brittle and tended to flake off. With the addition of minute amounts of citric acid, or other polycarboxylic acids, the pH, once adjusted to the desired value, remained constant and the iron was electrodeposited in a more uniform manner.

The following description will serve to further illustrate our process and is not to be taken as limitative of our invention.

The ilmenite ore used was obtained from the Ivry-Nord deposits located near Terrebonne in the Province of Quebec, Canada. A typical analysis of the ore expressed in percent by weight is as follows:

$Fe_2O_3$ ---- 28.14 ⎫
$FeO$ ---- 28.77 ⎬ 42.05% total iron
$TiO_2$ ---- 33.47
$SiO_2$ ---- 4.09
$Al_2O_3$ ---- 2.49
$MnO$ ---- 0.19
$CaO$ ---- 0.19
$MgO$ ---- 2.11
$V_2O_5$ ---- 0.31
$P_2O_5$ ---- Trace
$Na_2O$ ---- 0.11
$K_2O$ ---- None
$S$ ---- 0.40

The analysis of the ore varied slightly from sample to sample, however, the amount of the principal constituents was usually in the following range: 37–45% total iron, 30–35% titanium dioxide, and 4–8% silica, constituting well over 90% and usually over 95% of the Ivry-Nord ore.

*Example I*

The Ivry-Nord ore was ground to —325 mesh (Tyler Standard) by passing it through a jaw crusher, a roller crusher, and a wet ball mill, in series. When crushed to a coarser size, the time required for complete reduction of the ore was found to be increased. Obviously, where this is not a disadvantage, the ore need not be crushed to a size as fine as —325 mesh.

One hundred parts (100) by weight of the crushed ilmenite were intimately mixed with twenty-five (25) parts by weight of powdered coke and the mixture was reduced at a temperature of about 1000° C. for a period three to four hours in molybdenum lined graphite crucible. The reduced product was cooled in the furnace to prevent reoxidation. The cooled, reduced product was ground and subjected to a magnetic separation whereby unreduced ore, siliceous gangue and any excess carbon were separated from the desired products. The magnetic fraction was then ready for the extraction of the iron therefrom by leaching with ferric chloride. To accomplish this, the magnetic fraction was ball milled with an aqueous solution of ferric chloride in an amount sufficient to provide about 180% of that required for the reaction $Fe + 2FeCl_3 \rightarrow 3FeCl_2$. After ball milling for about thirty minutes, the resulting slurry was discharged from the ball mill and was stirred for another three hours. The mixture was then filtered and the residue washed with a small amount of hot water. As a result of this treatment, the titanium dioxide content was increased from 33% in the ore to 73% in the residue and approximately 92% of the iron in the original ilmenite had been separated from the titanium components of the ilmenite. The filtrate was found by analysis to consist of ferrous and ferric chlorides in almost equal amounts, by weight. The residue consisted of about 73% by weight $TiO_2$, 13% $SiO_2$ and the balance substantially all compounds of iron.

*Example II*

Another sample of ore was reduced and leached with ferric chloride as before. The filtrate was electrolyzed in the previously described cell at a temperature between 80 and 85° C., a cell voltage which rose from an initial voltage of 2.5 to a final voltage of 4.5 volts; and at 20 amperes for the cathode area of 35 square inches. The increase in cell voltage appeared to be directly related to the visible increase in the amount of hydrolysis product collecting on the cell diaphragm.

*Example III*

A larger batch of ore was reduced as before. The reduced product, after magnetic separation to separate gangue and excess reducing agent, was divided into eight fractions. The first fraction was leached with ferric chloride to which citric acid had been added, in the amount of 0.1 gram/liter of solution containing 300 grams of ferric chloride in 850 grams of water. The leaching proceeded in the same manner as in Example I. It was found that after filtration and washing with a small amount of hot water, the residue contained only about half as much iron as in the previous example. The filtrate obtained contained 175 parts of ferrous chloride and 150 parts of ferric chloride in 850 parts of water. The filtrate was electrolyzed in the previously described cell, with no noticeable formation of any hydrolysis products, and at a substantially constant cell voltage of 2.8 volts. Portions of the anolyte were withdrawn from time to time and employed as the leaching medium for treating additional reduced ore, and the resulting liquid was returned to the cathode compartment of the cell. The process was run in this manner until seven additional leachings and seven additional electrolysis had been completed. At the end of the run, it was found that extraction of the iron from the ore by the leach liquor was more complete, i. e. less iron was left associated with the enriched titaniferous residue, than in the preceding experiments employing ferric chloride, to which no addition of citric acid had been made. It was further noted that the cathode current efficiencies tended to be between 98 and 100% as compared with efficiencies of between 96 and 98% in the earlier examples. Although the recirculated liquor was subjected to heating and cooling as it progressed through the cycle, no noticeable precipitation of hydrolysis products or cloudiness of the solution was observed.

*Example IV*

The benefits of our invention may also be obtained in the electrolysis of solutions of ferrous chloride to produce a superior electrodeposit of iron on the cathode, apart from any cyclic operation as above described. Thus an aqueous solution was prepared containing 153 grams of ferrous iron as iron chloride and little or no ferric iron. To this solution one gram per liter of citric acid and ten grams per liter of manganese chloride were added. The resulting solution was electrolyzed for four hours at a temperature of between 80 and 84° C. in the cell previously described. With a current of twelve amperes, the cell voltage at the start of electrolysis was 2.75 volts. The cell voltage was measured at the end of one, two, three and four hours after the electrolysis had begun, and found to be 2.80, 2.55, 2.20 and 2.30 volts respectively. The pH of the catholyte varied between 1.10 and 1.12 and the pH of the anolyte varied between 0.55 and 0.58, showing that the electrolysis may be carried out in a very uniform manner when an appropriate addition of a suitable polycarboxylic acid is made to electrolyte. The cathode current efficiency in the foregoing run was at least as high as in similar runs made without the addition of citric acid. Other runs were made repeating substantially the cell operation described except that 0.05 and 0.1 gram per liter of citric acid were added instead of one gram per liter. The same uniformity of results was obtained. When operating in the manner indicated, the iron deposited on the cathode was found to be exceptionally pure and was, when removed from the cathode, admirably adapted to use in powder metallurgy processes. By coating the cathode with a formulation of graphite, xylene and ethyl cellulose, as disclosed in an earlier application filed by one of the present applicants, the deposit may be readily stripped when such a use is intended. Without such coatings the deposit adhered tenaciously to the cathode to produce a cladded article with a very pure iron coating.

We claim:

1. In a process for recovering the values in titaniferous iron ores which includes the following sequence of steps: reducing the iron content of the ore to metallic iron; leaching the iron from the reduced ore by means of an aqueous leach liquor containing ferric chloride, thereby producing a ferrous chloride containing aqueous liquid and a titania enriched solid residue; separating of said titania rich solid residue from said ferrous chloride containing liquid leach product; electrolyzing an acidic aqueous solution consisting essentially of said ferrous chloride containing liquid to produce a cathode deposit of metallic iron; and recycling spent aqueous electrolyte to the leaching step to leach further amounts of reduced ore; the improvement which comprises adding to an iron chloride containing aqueous-acidic liquid in said process, a polycarboxylic acid from the group consisting of citric, tartaric and succinic acids in an amount between 0.01% and 0.1% by weight of the liquid, thereby preventing hydrolysis of the liquid by maintaining the pH of same substantially below about 2.

2. In a process for recovering the values in titaniferous iron ores which includes the following sequence of steps:

reducing the iron content of the ore to metallic iron; leaching the iron from the reduced ore by means of an aqueous leach liquor containing ferric chloride, thereby producing a ferrous chloride containing aqueous liquid and a titania enriched solid residue; separating of said titania rich solid residue from said ferrous chloride containing liquid leach product; electrolyzing an acidic aqueous solution consisting essentially of said ferrous chloride containing liquid to produce a cathode deposit of metallic iron; and recycling spent aqueous electrolyte to the leaching step to leach further amounts of reduced ore; the improvement which comprises adding between about 0.01% and 0.1% by weight of citric acid to an iron chloride containing aqueous-acidic liquid in said process, thereby preventing hydrolysis of said liquid by maintaining the pH of same substantially below about 2.

3. In a process for recovering the values in titaniferous iron ores which includes the following sequence of steps: reducing the iron content of the ore to metallic iron; leaching the iron from the reduced ore by means of an aqueous leach liquor containing ferric chloride, thereby producing a ferrous chloride containing aqueous liquid and a titania enriched solid residue; separating of said titania rich solid residue from said ferrous chloride containing liquid leach product; electrolyzing an acidic aqueous solution consisting essentially of said ferrous chloride containing liquid to produce a cathode deposit of metallic iron; and recycling spent aqueous electrolyte to the leaching step to leach further amounts of reduced ore; the improvement which comprises adding between 0.1 and 0.01% by weight of citric acid to the iron chloride containing leach liquor in said process, thereby preventing hydrolysis of said liquids during the process by maintaining the pH of same substantially below about 2.

4. In a process for recovering the values in titaniferous iron ores which includes the following sequence of steps: reducing the iron content of the ore to metallic iron; leaching the iron from the reduced ore by means of an aqueous leach liquor containing ferric chloride, thereby producing a ferrous chloride containing aqueous liquid and a titania enriched solid residue; separating of said titania rich solid residue from said ferrous chloride containing liquid leach product; electrolyzing an acidic aqueous solution consisting essentially of said ferrous chloride containing liquid to produce a cathode deposit of metallic iron; and recycling spent aqueous electrolyte to the leaching step to leach further amounts of reduced ore; the improvement which comprises adding between about 0.01% and .1% by weight of citric acid to the iron chloride containing electrolyte in said process thereby preventing hydrolysis of said liquids during the process by maintaining the pH of same substantially below about 2.

5. In a process for recovering the values in titaniferous iron ores which includes the following sequence of steps: reducing the iron content of the ore to metallic iron; leaching the iron from the reduced ore by means of an aqueous leach liquor containing ferric chloride, thereby producing a ferrous chloride containing aqueous liquid and a titania enriched solid residue; separating of said titania rich solid residue from said ferrous chloride containing liquid leach product; electrolyzing an acidic aqueous solution consisting essentially of said ferrous chloride containing liquid to produce a cathode deposit of metallic iron; and recycling spent aqueous electrolyte to the leaching step to leach further amounts of reduced ore; the improvement which comprises adding to an iron chloride containing liquid in said process, tartaric acid in an amount between 0.01% and 0.1% by weight of the liquid, thereby preventing hydrolysis of said liquids in said process by maintaining the pH of same substantially below about 2.

6. In a process for recovering the values in titaniferous iron ores which includes the following sequence of steps: reducing the iron content of the ore to metallic iron; leaching the iron from the reduced ore by means of an aqueous leach liquor containing ferric chloride, thereby producing a ferrous chloride containing aqueous liquid and a titania enriched solid residue; separating of said titania rich solid residue from said ferrous chloride containing liquid leach product; electrolyzing an acidic aqueous solution consisting essentially of said ferrous chloride containing liquid in a diaphragm cell having an anode compartment and a cathode compartment separated by a semipermeable membrane, to produce a cathode deposit of metallic iron; and recycling spent electrolyte from the anode compartment to the leaching step to leach further amounts of reduced ore; the improvement which comprises adding between about 0.01% and 0.1% of citric acid to the liquid in the cathode compartment, thereby preventing hydrolysis of the electrolyte during said electrolysis by maintaining the pH of same substantially below about 2.

7. In a process for separately recovering the iron and titanium values in ilmenite which includes the following sequence of steps: comminuting the ore; reducing the iron content of the comminuted ore to metallic iron; leaching the iron from the reduced ore by means of an aqueous leach liquor containing ferric chloride, thereby producing a ferrous chloride containing aqueous liquid and a titania enriched solid residue; separating and recovery of said titania rich solid residue from said ferrous chloride containing liquid leach product by filtration; electrolyzing an acidic aqueous solution consisting essentially of said ferrous chloride containing leach product to produce a cathode deposit of metallic iron; recovering said iron; and recycling spent aqueous electrolyte to the leaching step to leach further amounts of reduced ore; the improvement which comprises adding to any iron chloride containing aqueous liquid in said process, a polycarboxylic acid from the group consisting of citric, tartaric, and succinic acids, in an amount between .01% and 0.1% by weight of the liquid thereby maintaining the pH of said liquid substantially below about 2 and thereby preventing hydrolysis of the iron compounds in said liquid.

8. In a process of electrolytically producing a cathode deposit of pure iron by electrolysis of electrolyte comprising an aqueous acidic solution of iron chlorides in a diaphragm type cell, the improvement which comprises preventing hydrolysis of said electrolyte by adding between about 0.01% and 0.1% by weight of a polycarboxylic acid from the group consisting of citric, tartaric and succinic acids to said electrolyte to maintain the pH of said electrolyte below about 2 during said electrolysis.

References Cited in the file of this patent

UNITED STATES PATENTS

| | | |
|---|---|---|
| 2,393,582 | Agnew | Jan. 29, 1946 |
| 2,441,856 | Turner et al. | May 18, 1948 |
| 2,523,160 | Struyke | Sept. 19, 1950 |
| 2,742,687 | Ruemmler | Apr. 24, 1956 |
| 2,752,300 | Cooper | June 26, 1956 |

OTHER REFERENCES

Transactions of the Electrochem. Soc., vol. 84 (1943), by Schaffert et al., pp. 319 to 333.